T 860,015

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1007

613,735
AZIRIDINYL PHOSPHINE OXIDE OR SULFIDE-SULFUR DIOXIDE TREATMENT

Duane L. Kenaga, 4622 Chatham Court, Midland, Mich. 48640

Filed Feb. 3, 1967. Published Mar. 25, 1969
Class 117—62.1
No Drawing. 17 Pages Specification

A cellulosic substrate (e.g., wood, paper, or a textile) is impregnated with an aziridinyl phosphine oxide or sulfide [e.g., tris(1-aziridinyl) phosphine oxide oxide] by:

(1) contacting the substrate with a solution of the aziridinyl phosphine oxide or sulfide in an inert solvent; and (2) contacting the impregnated cellulosic substrate with sulfur dioxide for a time sufficient to allow the sulfur dioxide to diffuse to the site of the aziridinyl phosphine oxide or sulfide in the impregnated cellulosic substrate and to combine chemically therewith.

When cellulosic substrates are treated according to this process, curing of the aziridinyl phosphine oxide may be carried out at ambient temperatures. The treatment has increased stability against leaching by water if the substrate is treated to remove the solvent after impregnation by the aziridinyl phosphine oxide or sulfide and before the sulfur dioxide treatment.